May 17, 1960      W. H. NEELY      2,936,821

REENFORCED WIRE SPRING STRUCTURE

Filed Nov. 5, 1957      2 Sheets-Sheet 1

INVENTOR.
WILLIAM H. NEELY
BY
ATT.

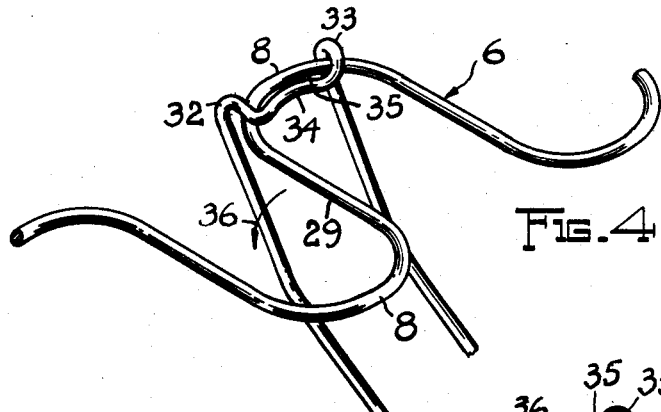
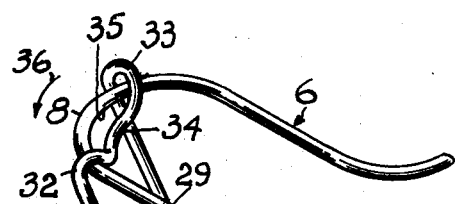
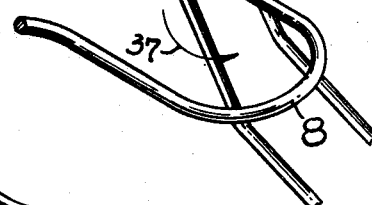
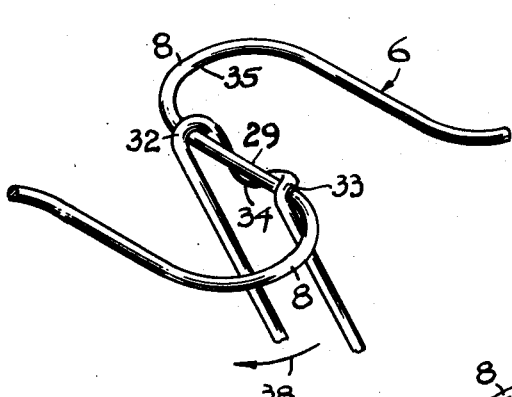
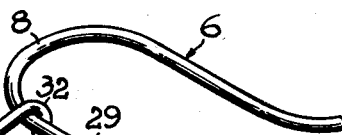

United States Patent Office 2,936,821
Patented May 17, 1960

2,936,821

REENFORCED WIRE SPRING STRUCTURE

William H. Neely, Cleveland, Ohio, assignor to Universal Incorporated

Application November 5, 1957, Serial No. 694,540

4 Claims. (Cl. 155—179)

This invention relates in general to seat and back spring constructions including wire springs, wire spring reenforcing members, wire bracing members, etc., and has particular reference to coupling connections between the wire springs and wire members of these constructions without employment of clips.

The primary object of the invention is the provision of wire springs, wire spring reenforcing members, wire bracing members, etc., with coupling means permitting non-releasable hinge connections between straight wire portions of wire springs and wire members by hinge-like engagement with curved wire portions of the springs and wire members and thereafter shifting of the coupling means to straight wire portions of such wire springs and wire members.

Another object of the invention is the provision of wire springs, wire spring reenforcing members, etc., with convoluted coupling means embodying oppositely arranged, spaced, hook-like wire loops and connecting wire cross-members extended between the wire loops at substantially right angles thereto.

A further object of the invention is the provision of wire springs, wire spring reenforcing members, etc., with convoluted coupling means of the type referred to above having their connecting wire cross members V-shaped and in symmetrical relation to the hook-like wire loops for engagement of the convoluted coupling means with opposite faces of straight wire portions of wire members, of which one face is engaged by the hook-like loop and the other face by the V-shaped wire cross member.

Still another object of the invention is a provision of wire springs, wire spring reenforcing members, etc., with convoluted coupling means of the type described having their hook-like wire loops and their V-shaped wire cross members bent on curves dimensioned to closely embrace straight wire portions of wire springs and wire members and spaced for proper coupling with curved wire portions of such wire springs and wire members.

With the above and other objects in view, the invention has other marked superiorities which clearly distinguish it from presently known structures and arrangement of this type. These improvements or characteristics, embodying certain novel features of construction and design, are clearly set forth in the appended claims and the preferred embodiment of the invention hereinafter shown with reference to the accompanying drawings forming part of the specification.

In the drawings:

Figs. 4 through 7 are views showing progressive positions in coupling a wire spring reenforcing member to a wire spring; thus Fig. 4 shows a convoluted coupling means hooked upon the loop of a wire spring.

Fig. 5 shows the convoluted coupling means shifted in the curvature of the loop to properly rest the hook-like wire loops of the convoluted coupling means on the curved wire of the loop.

Fig. 6 shows the convoluted coupling means shifted from the curvature of the loop into a straight wire portion, and Fig. 7 shows the wire spring reenforcing member tilted upon the wire member.

Figure 1:
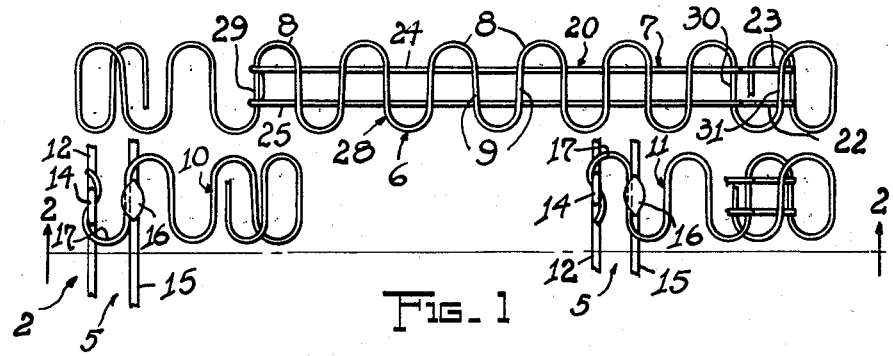
Fig. 1 is a fragmentary plan view of a wire spring construction with a supporting base mounting sinuously corrugated wire springs reenforced by wire spring reenforcing members, the springs and reenforcing members being connected by convoluted coupling means constructed in accordance with the invention.
Figure 2:
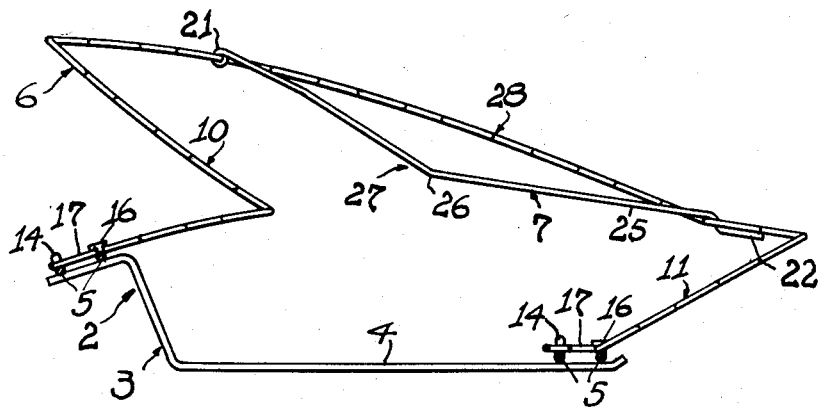
Fig. 2 is a sectional view taken on line 2—2 of Fig. 1.
Figure 3:
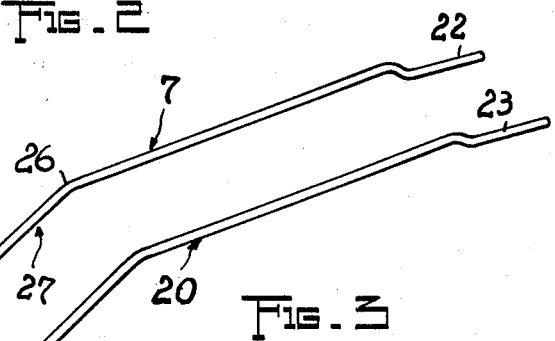
Fig. 3 is an enlarged perspective view of a wire spring reenforcing member of the type shown in Fig. 1.

Referring more particularly to the exemplified form of the invention shown in the drawings, wire spring construction 2 embodies a rigid, sturdy supporting base 3 having heavy wire stringers 4 and pairs of straight wire cross members 5 welded to the wire stringers crosswise thereof. Supporting base 3 removably supports on its pairs of wire cross members 5 a plurality of wire spring structures assembled from corrugated wire springs 6 and reenforcing auxiliary wire members 7. Each wire spring 6 has its oppositely extended loops 8 connected by substantially parallel cross wires 9 and embodies sinuously corrugated wire supporting arms 10 and 11 adapted to removably attach the wire spring to pairs of wire cross members 5. The pairs of wire cross members 5 each include a wire cross member 12 having sharply bent opening loops 14 and a wire cross member 15 including holding portions 16 formed by flattening the wire cross member 15. The pairs of wire cross members 5 have their wire cross members spaced to yieldingly hold the supporting arms in position by the yielding end loops 17 of the supporting arms.

Wire springs 6 are reenforced by elongated auxiliary wire members 7 without effecting the control and contour shape of these wire springs. These auxiliary wire members 7 each embody a U-shaped elongated body 20 having two arms 24 and 25, a convoluted coupling means 21 at one end and axially offset end portions 22, 23 at the other end. Body 20 has its arms 24, 25 bent at 26 to avoid contact of central portion 27 of the body with resting portion 28, is hinged with convoluted coupling means 21 to cross wire 29 of resting portion 28 of the wire spring and has the axially offset end portions 22, 23 extended through resting portion 28 between cross wires 30, 31 to interlace therewith for cantilever-like coupling of body 20 with resting portion 28. The convoluted coupling means 21 is non-releasably coupled with cross wire 29 and may be released therefrom without deformation by shifting the convoluted coupling means 21 from cross wire 29 to adjoining loops 8.

Convoluted coupling means 21 embodies two laterally spaced open loops 32, 33 which are connected with each other by curved web-like member 34 having a curvature fitting the loops 8 of wire spring 6. The open loops 32, 33 fit the gage of the wire of spring 6 and extend in planes vertically arranged with respect to the plane of body 20 to jointly form with curved web-like member 34 hook-shaped convoluted coupling means 21.

Securing of auxiliary wire member 7 to resting portion 28 of wire spring 6 is effected by attaching the convoluted coupling means 21 to cross wire 29 of resting portion 28. In this procedure the convoluted coupling means 21 is hookingly engaged with a loop 8 of the resting portion 28 to oppose curved web-like member 34 to inner face 35 of such loop and extend the open loops 32, 33 slightly above loop 8 and thereafter shifting the convoluted coupling means 21 in the direction of arrow 36 and then tilting such coupling means in the direction of arrow 37 to rest open loops 32, 33 upon cross wire 29 and extend curved web-like member 34 below the cross wire. A thus mounted auxiliary wire member is non-releasably hinged to cross wire 29 and coupled in cantilever-like fashion to the resting portion 28 of wire spring 6 by tilting the coupling means 21 in the direction of arrow 38. In this position auxiliary wire member 7 has its other end secured to resting portion 28 by extending the offset end portions 22, 23 through resting portion 28 and interlace these end portions with cross wires 30 and 31.

Spring structures of the type described are suitable for any loads and shock loads, as they transfer these loads through auxiliary reenforcing wire members to end portions of the spring resting portions and can provide any desired trim and load contour by suitable changes in length and wire diameters of the auxiliary wire spring members.

Having thus described my invention, what I claim is:

1. In a releasable hinge connection of wire elements a first wire element having straight and open-loop wire portions, and a second wire element having arms and a U-shaped portion hinged to said first wire element, said U-shaped portion including a convoluted web formed by opposed, substantially symmetrically arranged open loops and a curved cross member the curvature of which is smaller than the curvature of the loops of the open-loop wire portions of the first wire element, said cross member being curved to extend its middle portion into a plane intersecting the arms of the U-shaped portion and merged into the end of said open loops and dimensioned to substantially encircle with said open loops a straight wire portion of the first wire element and effect a non-releasable hinge connection therewith, said convoluted web when shifted to align with a loop of the open-loop wire portions of the first wire element, permitting uncoupling of the second wire element from said first wire element.

2. A releasable hinge connection as described in claim 1, having the opposed open loops of the convoluted web arranged to contact the wire of a straight portion of the first wire element at one side and the curvature of the curved cross member of the convoluted web dimensioned to contact the wire of said straight portion on the opposite side in substantially symmetrical relation to the opposed open loops of the convoluted web.

3. In a releasable hinge connection of wire elements a first wire element having straight and open-loop wire portions, and a second wire element having a U-shaped end portion hinged to the straight portion of said first wire element, said U-shaped end portion including two arms and a convoluted web connecting said arms, said convoluted web including substantially parallel open end loops and a cross member merged into ends of said open end loops, said cross member being curved to extend its middle portion into a plane intersecting the arms of said U-shaped end portion and being dimensioned to substantially encircle with said open loops the straight portion of the first wire element for a non-releasable hinge connection therewith, the cross member being curved to freely extend into a loop of the open-loop wire portion of the first wire element when the second wire element is shifted to extend opposite an open-loop wire portion of the first wire element and permit in this position uncoupling of the hinge connection between the wire elements.

4. In a releasable hinge connection of wire elements a first wire element having a straight wire portion and an open loop wire portion, and a second wire element having a U-shaped end portion hinged to the straight wire portion of the first wire element, said U-shaped end portion including two arms and a convoluted web connecting said arms, said convoluted web embodying opposed, substantially parallel open end loops and a curved cross member merged into ends of said opposed open end loops, the curved cross member being curved to extend into a plane intersecting the arms of said U-shaped end portion to substantially encircle the straight wire portion of the first wire element by said convoluted web of the second wire element and non-releasably hinge same to the first wire element, the curvature of the cross member of the second wire element being smaller than the curvature of the open-loop wire portion of the first wire element to permit uncoupling of the non-releasable hinge connection when the second wire element has been shifted to the open-loop portion of the first wire element.

References Cited in the file of this patent

UNITED STATES PATENTS

| | | |
|---|---|---|
| 2,657,740 | Daniels et al. | Nov. 3, 1953 |
| 2,851,088 | Pietruszka | Sept. 9, 1958 |